(12) United States Patent
Freiheit

(10) Patent No.: US 11,358,730 B1
(45) Date of Patent: Jun. 14, 2022

(54) SYSTEMS AND METHODS FOR AN AIRCRAFT MOTION OBSERVER IN AN ELECTRIC AIRCRAFT

(71) Applicant: BETA AIR, LLC, South Burlington, VT (US)

(72) Inventor: Collin Freiheit, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/525,600

(22) Filed: Nov. 12, 2021

(51) Int. Cl.
| B64D 31/00 | (2006.01) |
| B64D 31/06 | (2006.01) |
| B64D 27/24 | (2006.01) |
| B64C 13/16 | (2006.01) |
| B64C 13/50 | (2006.01) |

(52) U.S. Cl.
CPC ............. *B64D 31/06* (2013.01); *B64C 13/16* (2013.01); *B64C 13/503* (2013.01); *B64D 27/24* (2013.01)

(58) Field of Classification Search
CPC ........ B64D 31/06; B64D 27/24; B64C 13/16; B64C 13/503
See application file for complete search history.

(56) References Cited

U.S. PATENT DOCUMENTS

| 6,672,544 B2 | 1/2004 | McGovern et al. |
| 6,879,885 B2 | 4/2005 | Driscoll et al. |
| 9,715,230 B2 | 7/2017 | Erhart et al. |
| 10,759,519 B2 | 9/2020 | Blanding et al. |
| 11,084,584 B2 | 8/2021 | Sloan et al. |
| 2006/0070461 A1* | 4/2006 | Delair ............... G01M 13/027 73/862.325 |
| 2016/0200420 A1 | 7/2016 | McKenna et al. |
| 2019/0033890 A1 | 1/2019 | Douglas et al. |
| 2019/0185160 A1 | 6/2019 | Sababha et al. |
| 2020/0207483 A1 | 7/2020 | Meidad |
| 2021/0055731 A1 | 2/2021 | Wang et al. |

* cited by examiner

*Primary Examiner* — Ian Jen
(74) *Attorney, Agent, or Firm* — Caldwell Intellectual Property Law; Keegan Caldwell; Charles Dresser

(57) ABSTRACT

A command model connected to plurality of flight components of an electric aircraft and comprises a circuitry configured to detect a predicted state and a measured state datum, transmit predicted state datum to an actuator model, and transmit measured state datum to a plant model. An actuator model connected to the sensor configured to receive the predicted state datum and generate a performance datum. A plant model connected to the sensor configured to receive measured state datum and performance datum from the actuator model, transmit a feedback path to controller, and generate an inconsistency datum as a function of the measured state datum and the performance datum. A controller communicatively connected to the sensor, wherein the controller is configured to receive the inconsistency datum from the plant model and apply a torque to the aircraft as a function of the inconsistency datum.

20 Claims, 7 Drawing Sheets

SYSTEMS AND METHODS FOR AN AIRCRAFT MOTION OBSERVER IN AN ELECTRIC AIRCRAFT

FIELD OF THE INVENTION

The present invention generally relates to the field of electric aircrafts. In particular, the present invention is directed to a system and method for an aircraft motion observer in an electric aircraft.

BACKGROUND

During flight, it may be challenging to monitor the states of flight components and their impact on the aircraft's torque. With an aircraft motion observer like the one explained herein, aircraft torque can be adjusted to help increase the sufficiency of the performance of the flight components.

SUMMARY OF THE DISCLOSURE

In an aspect, a system for an aircraft motion observer in an electric aircraft is illustrated. A command model communicatively connected to a plurality of flight components of an electric aircraft, wherein the command model comprises a circuitry configured to detect a predicted state datum of each flight component of the plurality of flight components, detect a measured state datum of each pilot input of a plurality of pilot inputs, transmit the predicted state datum of each flight component of the plurality of flight components to an actuator model, and transmit the measured state datum of each pilot input of the plurality of pilot inputs to a plant model as a function a feed forward path. An actuator model communicatively connected to the sensor, wherein the actuator model comprises circuitry configured to receive the predicted state datum of each flight component of the plurality of flight components from the sensor and generate a performance datum for each flight component of the plurality of flight components as a function of the predicted state datum. A plant model communicatively connected to the sensor, wherein the plant model comprises circuitry configured to receive the measured state datum of each pilot input of the plurality of pilot inputs from the sensor, receive the performance datum from the actuator model, transmit a feedback path to a controller as a function of the measured state datum and the performance datum, and generate an inconsistency datum as a function of the measured state datum and the performance datum. A controller communicatively connected to the sensor, wherein the controller comprises circuitry configured to receive the inconsistency datum from the plant model and apply a torque to the aircraft as a function of the inconsistency datum.

In another aspect, a method for an aircraft motion observer in an electric aircraft is also illustrated. The method includes detecting, at a command model communicatively connected to a plurality of flight components, a predicted state datum of each flight component of the plurality of flight components and a measured state datum of each pilot input of a plurality of pilot inputs. It also includes generating, at an actuator model, a performance datum for each flight component of the plurality of flight components as a function of the predicted state datum, communicatively connecting a plant model to the sensor, receiving, at the plant model, the measured state datum of each pilot input of the plurality of pilot inputs via a feed-forward path, transmitting, at the plant model, a feedback path to a controller as a function of the measured state datum and the performance datum, generating, at the plant model, an inconsistency datum as a function of the measured state datum and the performance datum and applying, at a controller, a torque to the aircraft as a function of the inconsistency datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an aircraft with an aircraft motion observer. In an embodiment, this disclosure includes an aircraft configured to include a command model, actuator model, plant model, and a controller. Aspects of the present disclosure include a plurality of flight components and a sensor connected to the models and controller. Aspects of the present disclosure include at least a controller to receive the inconsistency datum and apply a torque to the aircraft. Exemplary embodiments illustrating aspects of the present disclosure are described below in the context of several specific examples.

Figure 1:
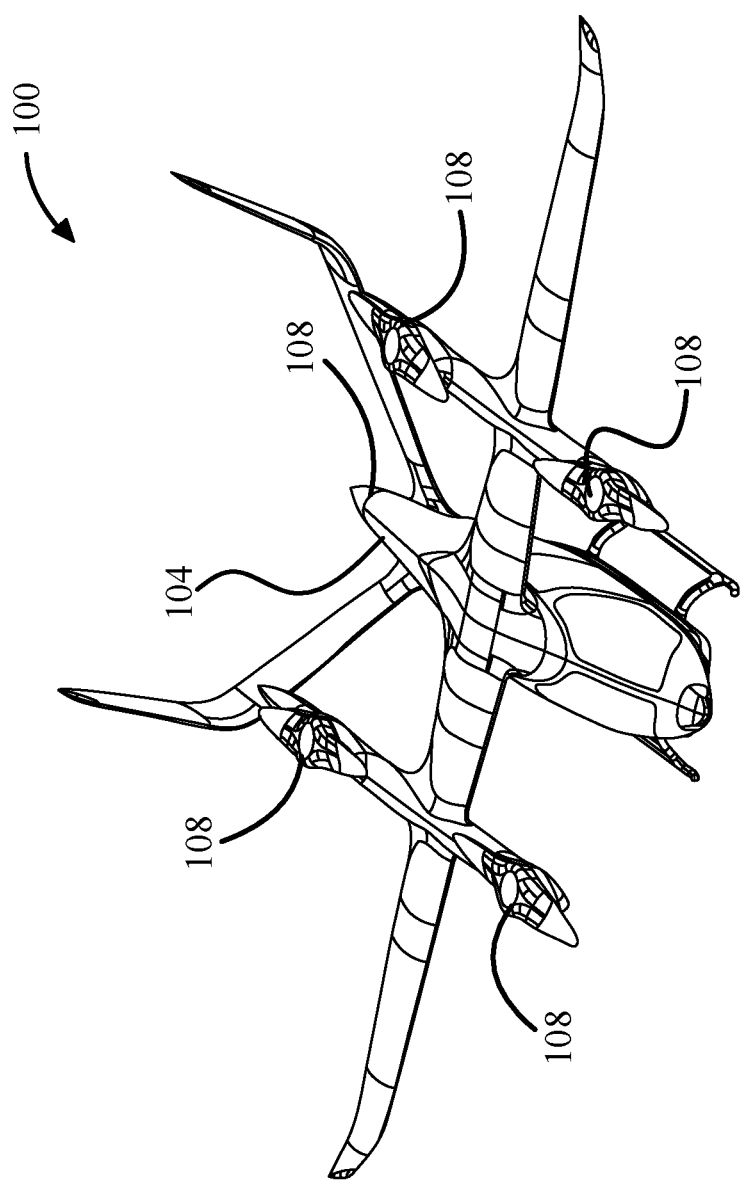
FIG. 1 is a diagrammatic representation of an exemplary embodiment of an electric aircraft.

Referring now to FIG. 1, an exemplary embodiment of an aircraft 100 is illustrated. In an embodiment, aircraft 100 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

Still referring to FIG. 1, aircraft 100, may include a fuselage 104, a flight component 108 (or one or more flight components 108), computing device 112, and a sensor 116. Both the computing device 112 and sensor 116 are described further herein with reference to FIG. 2.

As used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 100, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 1, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104. Fuselage 104 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers includes the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque includes only structural skin, and in that sense, aircraft skin undergoes stress by applied aerodynamic fluids imparted by the fluid. Stress as used in continuum mechanics may be described in pound-force per square inch (lbf/in$^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings may be structures which may include airfoils configured to create a pressure differential resulting in lift. Wings may generally dispose on the left and right sides of the aircraft symmetrically, at a point between nose and empennage. Wings may include a plurality of geometries in planform view, swept swing, tapered, variable wing, triangular, oblong, elliptical, square, among others. A wing's cross section geometry may include an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may include differing and/or similar cross-sectional geometries over its cord length or the length from wing tip to where wing meets aircraft's body. One or more wings may be symmetrical about aircraft's longitudinal plane, which includes the longitudinal or roll axis reaching down the center of aircraft through the nose and empennage, and plane's yaw axis. Laterally extending element may include controls surfaces configured to be commanded by a pilot or pilots to change a wing's geometry and therefore its interaction with a fluid medium, like air. Control surfaces may include flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may include a combination of control surfaces to perform maneuvers while flying or on ground.

Still referring to FIG. 1, aircraft 100 may include a plurality of flight components 108. As used in this disclosure a "flight component" is a component that promotes flight and guidance of an aircraft. In an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, plurality of flight components 108 may include at least a lift propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis. The lift propulsor is further described herein with reference to FIG. 2.

In an embodiment, and still referring to FIG. 1, plurality of flight components 108 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 1, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, plurality of flight components 108 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 100 forward with an equal amount of force. In an embodiment, and without limitation, the more air forced behind aircraft, the greater the thrust force with which aircraft 100 is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 2:
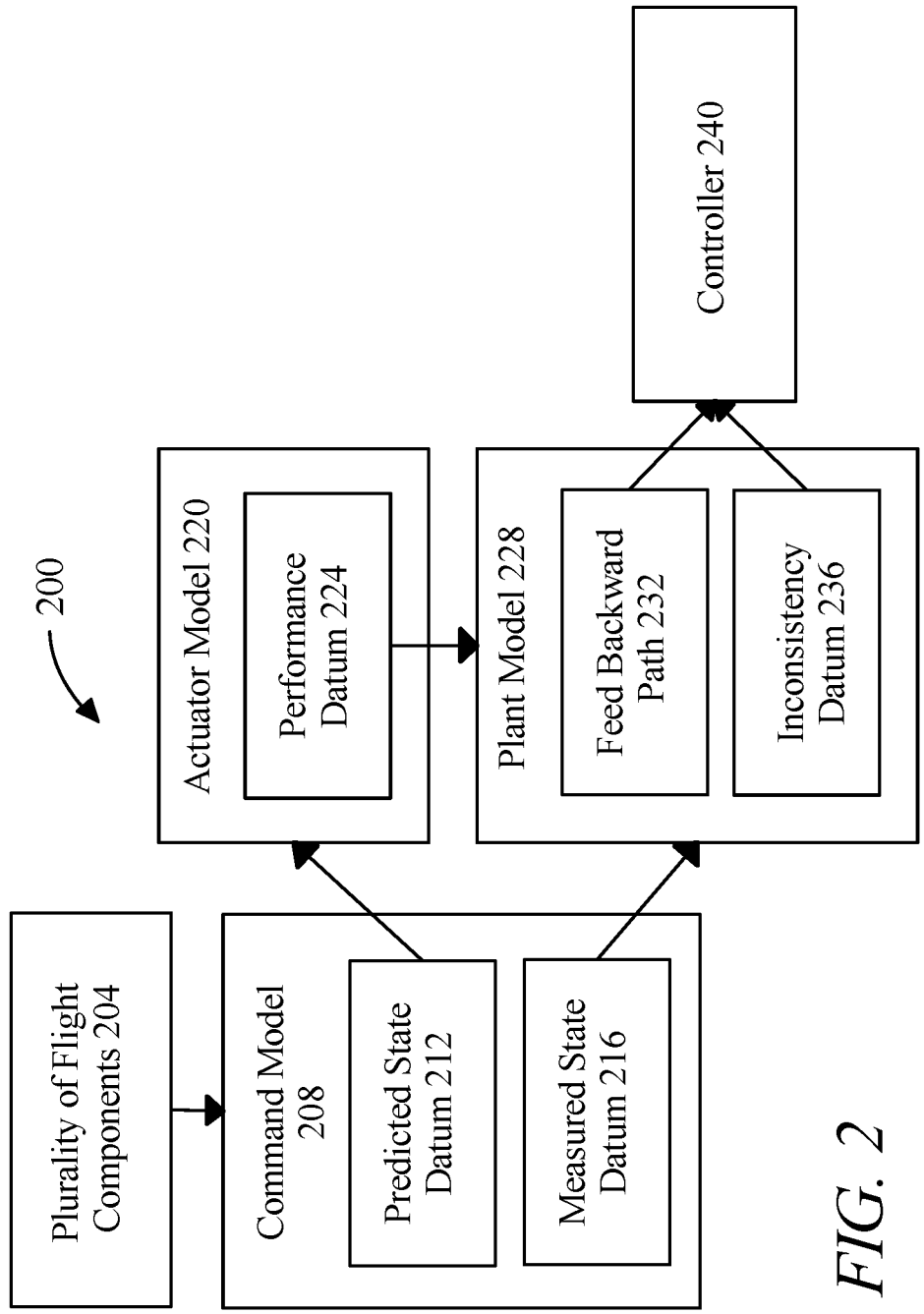
FIG. 2 is a block diagram of an exemplary embodiment of a system for an aircraft motion observer in an electric aircraft.

Now referring to FIG. 2, system 200 illustrates a block diagram of an exemplary embodiment of a system for an aircraft motion observer in an electric aircraft. System 200 includes a plurality of flight components 204, a command model 208, predicted state datum 212, measured state datum 216, actuator model 220, performance datum 224, plant model 228, feed backward path 232, inconsistency datum 236, and controller 240. A "motion observer", for the purposes of this disclosure, is a system that provides an estimate of a state of a given real system, from measurements of the input and output of the real system. Motion observers are often used with feedback wherein physical states of the system cannot easily be determined by direct observation. A system can be indirectly observed from effects on the state as measured outputs. One or more components of motion observer 100, as described in further detail below, may be implemented using one or more computing devices, including without limitation a module and/or component including a computing device and/or a module and/or component implemented by programming a computing device; multiple modules and/or components may be components of a single computing device. A computing device may include any computing device as described in this disclosure, including without limitation a microcontroller, microprocessor, digital signal processor (DSP) and/or system on a chip (SoC) as described in this disclosure. Computing devices may include, be included in, and/or communicate with a mobile device such as a mobile telephone or smartphone. A computing device may include a single computing device operating independently, or may include two or more computing device operating in concert, in parallel, sequentially or the like; two or more computing devices may be included together in a single computing device or in two or more computing devices. A computing device may interface or communicate with one or more additional devices as described below in further detail via a network interface device. Network interface device may be utilized for connecting a computing device and/or other component to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. A computing device and/or one or more modules and/or components disclosed in this disclosure may include but is not limited to, for example, a computing device or cluster of computing devices in a first location and a second computing device or cluster of computing devices in a second location. A computing device and/or one or more modules and/or components disclosed in this disclosure may include one or more computing devices dedicated to data storage, security, distribution of traffic for load balancing, and the like. A computing device and/or one or more modules and/or components disclosed in this disclosure may distribute one or more computing tasks as described below across a plurality of computing devices of computing device, which may operate in parallel, in series, redundantly, or in any other manner used for distribution of tasks or memory between computing devices. A computing device and/or one or more modules and/or components disclosed in this disclosure may be implemented using a "shared nothing" architecture in which data is cached at the worker, in an embodiment, this may enable scalability of a computing device and/or one or more modules and/or components disclosed in this disclosure and/or computing device. Aircraft motion observer may include any aircraft motion observer as described in U.S. Nonprovisional application Ser. No. 17/218,403, filed on Mar. 31, 2021, and entitled "AIRCRAFT MOTION OBSERVER CONFIGURED FOR USE IN ELECTRIC AIRCRAFT," the entirety of which is incorporated herein by reference.

Still referring to FIG. 2, system 200 includes command model 208 communicatively connected to plurality of flight components 204 and comprises a sensor and a circuitry. As used in this disclosure, a "command model" is a model used to process an incoming command. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. Command model may be implemented using circuitry; circuitry may include any type of analog circuitry such as without limitation operational amplifier circuits. Circuitry may include digital circuitry, which may include combinational and/or synchronous or non-synchronous sequential circuitry. Circuitry may include one or more integrated circuits such as an application-specific integrated circuit (ASIC), one or more reconfigurable hardware circuits such as without limitation a field programmable gate array (FPGA), and/or one or more processors, microcontrollers, or the like. Circuitry may include memory, including instruction memory, which may be used to program circuitry; such programming may be considered part of circuitry for the purposes of this disclosure. In an embodiment, a command model may be implemented using program instructions to be executed on a processor shared with one or more other models as described in further detail below; alternatively or additionally command model may be implemented using instructions to be implemented on a dedicated processor, or using hardware encoding. Any combination of the above types and/or elements of circuitry is contemplated as potentially included in command model. Command model 208 also may contain a sensor connected to plurality of flight components 204. As used in this disclosure a "sensor" is a device, module, and/or subsystem, utilizing any hardware, software, and/or any combination thereof to detect events and/or changes in the instant environment and transmit the information; transmission may include transmission of any wired or wireless electronic signal. Sensor 204 may be attached, mechanically coupled, and/or communicatively coupled, as described above, to aircraft. Sensor 132 may include, torque sensor, gyroscope, accelerometer, torque sensor, magnetometer, inertial measurement unit (IMU), pressure sensor, force sensor, proximity sensor, displacement sensor, vibration sensor, among others. Sensor 132 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

Referring still to FIG. 2, command model 208 is configured to detect predicted state datum 212 of each flight component of plurality of flight components 204. In this disclosure, "predicted state datum" is a prediction of the data identifying and/or describing a torque the pilot desires each flight component of plurality of flight components 204 to produce. Examples of predicted state datums 212 may be any sort of motion/forces/moments/torques acting on the aircraft, such as an inertial measurement unit, a torque measurement like 34 lb/ft, a force measurement like 500 N, or a motion description like "forward motion". Thus, sensor detects predicted state datum 212 for plurality of flight components 204 in the system.

Referring still to FIG. 2, command model 208 is configured to detect measured state datum 216 of each pilot input of a plurality of pilot inputs. A "measured state datum", for the purposes of this disclosure, is one or more elements of data representing the actual motion/forces/moments/torques acting on the aircraft in the real world as a function of the at least an aircraft command 104. A "measured state datum" includes an inertial measurement unit. An "inertial measurement unit", for the purposes of this disclosure, is an electronic device that measures and reports a body's specific force, angular rate, and orientation of the body, using a combination of accelerometers, gyroscopes, and magnetometers, in various arrangements and combinations. Sensor measures aircraft's actual response in the real world to the at least a pilot input. One of ordinary skill in the art would appreciate, after reviewing the entirety of this disclosure, that motion may include a plurality of types including but not limited to: spinning, rotating, oscillating, gyrating, jumping, sliding, reciprocating, or the like. Examples of measure state datum 216 include the same examples of predicted state datum 212, but the difference is predicted state datum 212 is a prediction while measured state datum 216 is a real measurement from the sensor, which this connected to the circuitry of command model 208.

Still referring to FIG. 2, command model 208 is configured to transmit predicted state datum 212 of each flight component of plurality of flight components 204 to an actuator model 220. Command model 208 transmits predicted state datum 212 after it is identified by sensor. Command model 208 transmits predicted state datum 212 to an actuator model 220. In this disclosure, an "actuator model" is a mathematical model of the dynamics of plurality of flight components 204 and is further explained below.

Still referring to FIG. 2, command model 208 is configured to transmit measured state datum 216 of each pilot input of plurality of pilot inputs to plant model 228 as a function a feed forward path. Command model 208 transmits measured state datum 216 after it is identified by sensor. Command model 208 transmits measured state datum 216 to a plant model 228. In this disclosure, an "plant model" is a mathematical model of torque produced on aircraft when computational fluid dynamics are applied to plurality of flight components 204 in varied positions and is further explained below.

Still referring to FIG. 2, system 200 includes actuator model 220 communicatively connected to sensor and comprises a circuitry. Actuator model 220 is configured to model the effect of a fluid medium on each of plurality of flight components 204 through the full range of motion of each of plurality of flight components 204. Actuator model 220 may include a mathematical model of the dynamics of each of plurality of flight components 204. Mathematics models may include, 1D rotational body, static speed-thrust curve, or linear programs as a function of airspeed. Actuator model 220 may be configured on controller 240 or a separate controller in communication with controller 240 of this system. Actuator model 220 may perform and/or implement analysis utilizing fluid mechanics. In an embodiment and without limitation, actuator model 220 may perform and/or implement computational flow dynamic (CFD) analysis wherein one or more computing devices simulate the flow of a fluid comprising adjustable parameters and the resultant forces and torques on each of the plurality of bodies present in simulation. For the purposes of this disclosure, CFD analysis may include any computer analysis including physics-based simulation of fluid flows over solid bodies. For example, and without limitation, for each of plurality of flight components 204 desired to be modeled, CFD analysis may be employed at a plurality of operating points. "Operating points", for the purposes of this disclosure, are modeled positions of a flight component subject to CFD analysis, for example, one operating point may be the neutral position of a flight component and a second operating point of the same flight component may be the maximum deflected position. CFD analysis may be employed at any number of operating points, either manually, automatedly, or a combination thereof. One of ordinary skill in the art would appreciate, after reviewing the entirety of this disclosure, the near limitless arrangement and systems of storing the plurality of data generated as a result of actuator model 220. For example, and without limitation, matrices, columns, rows, vectors, tables, databases, datastores, and the like may store data as raw data, prepare date for manipulation or conditioning, or another operation or combination of operations for use in the system herein described. Actuator model 220 may be a separate model than the hereinbelow described plant model as it simplifies plant model 228 for the herein disclosed reasons, at least. Actuator model 220 may generate resultant torques, forces, moments, the components thereof in three-dimensional space, the cumulative force and/or torque on an aircraft as a whole, or another combination of outputs. Actuator model 220 may include information regarding aircraft trajectory as it relates to torques and forces. For example, and without limitation, actuator model 220 may output resultant torque on an airfoil section of a wing with a flap, that changes aircraft's trajectory with respect to pitch, roll, and yaw. Pitch, roll, and yaw are consistent with any description of pitch, roll, and yaw in the entirety of this disclosure. An aircraft's "trajectory", for the purposes of this disclosure, is the flight path that an object with mass in motion follows through space as a function of time. Actuator model 220 may include the geometry of any flight component as described herein, and in non-limiting embodiments, include geometry of any flight component or combination thereof not listed herein. Flight component geometry, for the purposes of this disclosure, may include suitable 3D computer aided design models, structures, two-dimensional drawings, engineering drawings, technical drawings, lofting drawings, sets of points in space, parameters of structures herein described like weight, mass, density, and the like, among others. Moreover, actuator model 220 is configured to receive predicted state datum 212 of each flight component of plurality of flight components 204 from sensor.

Still referring still to FIG. 2, actuator model 220 is configured to generate performance datum 224 for each flight component of plurality of flight components 204 as a function of predicted state datum 212. A "performance datum", for the purposes of this disclosure, is a mathematical datum or set of data that presents resultant forces, torques, or other interactions between plurality of flight components 204 and the fluid flow in order to predict the behavior of flight components during performance. Performance datum 224 may be represented by one or more numbers, values, matrices, vectors, mathematical expressions, or the like for use in one or more components of system 200. Performance datum 224 may be an electrical signal capable of use by one or more components of system 200. Performance datum 224 may be an analog or digital signal. Motion observer 200 may include electronics, electrical components, or circuits configured to condition signals for use between one or more components present within system like analog to digital converters (ADC), digital to analog converters (DAC), and the like.

Still referring still to FIG. 2, system 200 includes plant model 228 communicatively connected to sensor. Plant model 228 includes a mathematical model of torque produced on electric aircraft 100 when computational fluid dynamics are applied to plurality of flight components 204. Plant model 228 may be a component of control theory which includes a process and an actuator. Plant model 228 may be configured on controller 240 or a separate controller in communication with controller 240 of this system. Plant model 228 may be a linear differential equation. A plant is often referred to with a transfer function which indicates the relation between an input signal and the output signal of a system without feedback, commonly determined by physical properties of the system. In a system with feedback, as in illustrative embodiments, herein described, the plant still has the same transfer function, but a control unit and a feedback loop, which possess their own transfer functions, are added to the system. Plant model 228 may include one or more computer models representing rigid body mechanics, rigid body dynamics, or a combination thereof. A "rigid body", for the purposes of this disclosure, is a solid body in which deformation is zero or so small it can be neglected. For example, the distance between any two given points on a rigid body remains constant in time regardless of the external forces or moments exerted on it. Additionally, a rigid body is usually considered as a continuous distribution of mass. The position, kinematic, and kinetic quantities describing the motion of a rigid body include linear and angular components, respectively.

With continued reference to FIG. 2, plant model 228 may include a Newton Euler computational flow dynamic model (CFD). A Newton Euler CFD may include a model in which a plurality of flows may be simulated over a plurality of flight components over the entire range of motion of flight components and resultant torques and forces generated therefrom may be modeled. CFD analysis may be the same or similar to CFD analysis described in this disclosure with regard to actuator model 220. Flight components used in a Newton Euler CFD may be any of flight components as described in this disclosure, including but not limited to, actuators, control surfaces, geometries related to an aircraft, and the like, among others. The "flows" for the purposes of this disclosure, is the flow of a liquid or gas over a physical body with a volume. Flows may include any fluid with the necessary viscosity to flow over a solid body. Flow may include inviscid flow, turbulent flow, incompressible flow, compressible flow, and laminar flow, among others. CFD analysis may also include and/or model resultant torques and forces on an aircraft in one or more orientations with respect to flow. "Laminar flow", for the purposes of this disclosure, is characterized by fluid particles following smooth paths in layers, with each layer moving smoothly past the adjacent layers with little or no mixing. "Turbulent flow", for the purposes of this disclosure, is fluid motion characterized by chaotic changes in pressure and flow velocity; this may represent a contrast to a laminar flow, which occurs when a fluid flows in parallel layers, with no disruption between those layers. "Inviscid flow", for the purposes of this disclosure, is the flow of an inviscid fluid, in which the viscosity of the fluid is equal to zero. "Incompressible flow", for the purposes of this disclosure, is a flow in which the material density is constant within a fluid parcel—an infinitesimal volume that moves with the flow velocity. An equivalent statement that implies incompressibility is that the divergence of the flow velocity is zero. "Compressible flow", for the purposes of this disclosure, is a flow having a significant change in fluid density. While all flows are compressible in real life, flows may be treated as being incompressible when the Mach number is below 0.3.

Referring still to FIG. 2, plant model 228 comprises a circuitry and is configured to receive measured state datum 216 of each pilot input of the plurality of pilot inputs from sensor. Similarly to command model 204 and actuator model 220, plant model 228 also includes a circuitry configured using computer programs. Plant model 228 is also configured to receive performance datum 224 from actuator model 220.

Referring still to FIG. 2, plant model 228 transmits feed backward path 232 to controller 240 as a function of measured state datum 216 and performance datum 212. In this disclosure, a "feed backward path" is the measures or actions planned in order to eliminate problems in the processes being monitored. If problems or deviations from an optimal state are identifies in the process, feed backward path 232 generates actions to take in order to get to the optimal state. Feed backward path 232 tells controller 240 what to do in order to get aircraft 100 back to its optimal state, such as adjusting torque, which is further explained below.

Referring still to FIG. 2, plant model 228 generates inconsistency datum 236 as a function of measured state datum 216 and performance datum 224. Controller 240 generates, as a function of the comparing, generate inconsistency datum 236. In this disclosure, "inconsistency datum" is a mathematical function to compensate for the difference between predictive state datum 212 and measured state datum 216. Controller 240 generates inconsistency datum 236 such that inconsistency datum 236 on the subsequent control loop can be an input to plant model 228 and preemptively adjust predicted datum 212 as to more accurately predict aircraft behavior. In a non-limiting illustrative example, if plant model 228 generates perfect predictive datum 212, such that it perfectly predicts the aircraft behavior given a pilot input, actuator model 220 and performance datum 224, then measured state datum 216 detected by sensor would represent the same quantities. Therefore controller 240 would generate inconsistency datum 236 that would not provide any additional compensation on the subsequent control loop.

Still referring still to FIG. 2, system 200 includes controller 240 communicatively connected to sensor and comprising a circuitry. Controller 240 is configured to compare predictive datum 212 and measured state datum 216. Controller 240 may include one or more circuit elements communicatively and electrically connected to one or more components described herein. Controller 240 may perform one or more mathematical operations, manipulations, arithmetic, machine-learning, or a combination thereof on one or more elements of data. Controller 240 may include at least an integrator, which will be discussed at greater length in reference to FIG. 2.

With continued reference to FIG. 2, controller 140 may be designed to a linear approximation of a nonlinear system. Linearization is a linear approximation of a nonlinear system that is valid in a small region around an operating point. Linearization may be employed in higher order systems such that inputs and outputs may be more easily controlled using a control loop as disclosed herein. For example, and without limitations linearization can be used with feedforward control, open loop control, feedback control, among others, alone or in combination.

Referring still to FIG. 2, controller 240 receives inconsistency datum 236 from plant model 228. Controller 240 may include circuitry configured to transmit inconsistency datum 236 as analog or digital electrical signals consistent with any in the entirety of this disclosure. Controller 240 may include electronic components such as one or more receivers, transmitters, transceivers, a combination thereof, or other components not herein described configured to transmit data such as inconsistency datum 236. Controller 240 may include circuitry, components, or combinations thereof configured to transmit inconsistency datum 236 or other data not herein disclosed to plurality of flight components 204 communicatively connected to aircraft 100.

Referring still to FIG. 2, controller 240 applies a torque to aircraft 100 as a function of inconsistency datum 236. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of flight components 204 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of flight components 204 may include a rudder, which may include, without limitation, a segmented rudder that produces a torque about a vertical axis. Additionally or alternatively, plurality of flight components 204 may include other flight control surfaces such as propulsors, rotating flight controls, or any other structural features which can adjust movement of aircraft 100. Plurality of flight components 204 may include one or more rotors, turbines, ducted fans, paddle wheels, and/or other components configured to propel a vehicle through a fluid medium including, but not limited to air. As a result of inconsistency datum 236, controller 240 adjusts torque of aircraft 100 to attempt and reach the optimal state. Application of the torque to the aircraft is configured to adjust the performance datum, wherein the application of the torque will cause the performance datum and the measured state datum to match.

Figure 3:
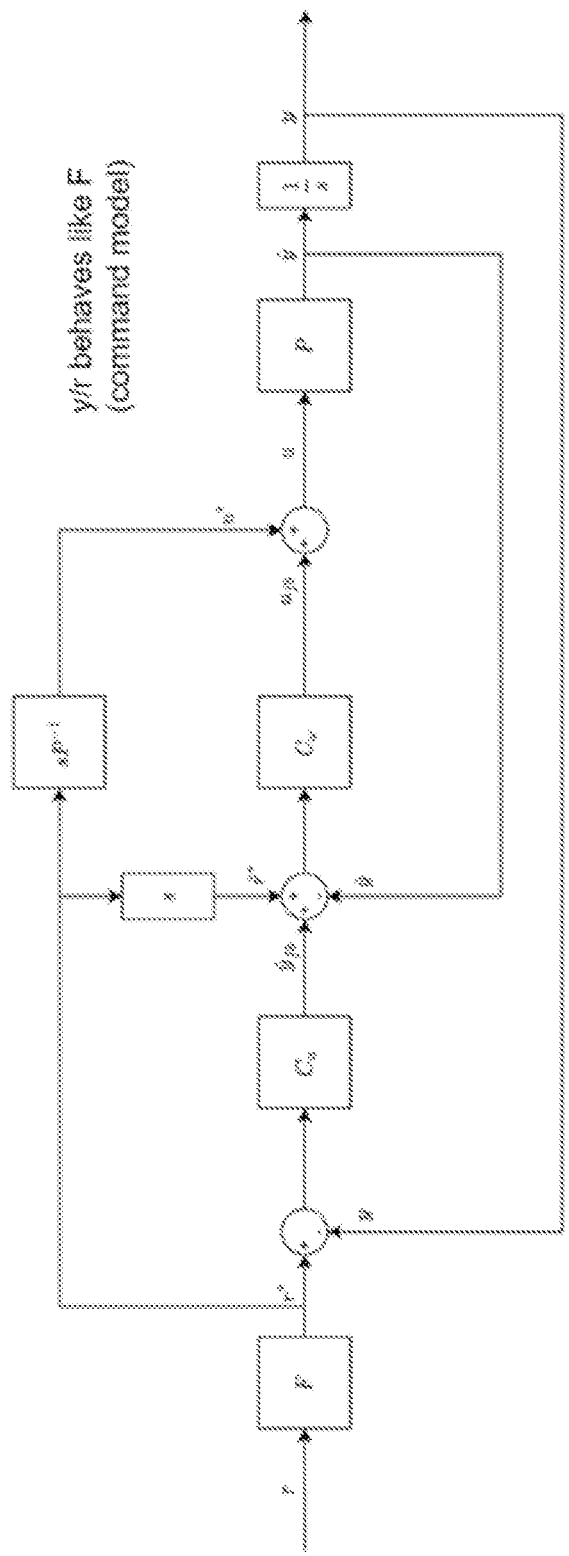
FIG. 3 is a block diagram of an exemplary embodiment of a control system.

Now referring to FIG. 3, illustrates an exemplary embodiment of a block diagram for the control system presented in this disclosure. In the illustrated control block diagram, which is presented for exemplary purposes only, the variables are as follows: F is command model, r is a reference or setpoint for what you want variable y to track, y is the system output, $\dot{y}$ is the time derivative of y, u is the output of the controller aka the control command, P is plant model, 1/s is an integrator, s is a differentiator, $u_{fb}$ is the feedback contribution of u, u* is the feedforward contribution of u, $P^{-1}$ is the dynamic inverse of P, $C_w$ is the inner loop controller, $C_a$ is the outer loop controller, r* is the filtered reference r after being filtered through command mode F, $\dot{r}^*$ is the derivative of r*, $\dot{y}_{jb}$ is the feedback contribution to the inner loop controller. Control system and motion observer may include without limitation any control system and/or motion observer as described in U.S. Nonprovisional application Ser. No. 17/218,403, filed on Mar. 31, 2021, and entitled "AIRCRAFT MOTION OBSERVER CONFIGURED FOR USE IN ELECTRIC AIRCRAFT," the entirety of which is incorporated herein by reference.

Still referring to FIG. 3, signal r may be sent to command model F, which may output filtered command r*. Filtered command r* may then be sent to plant model P as a function of a feedforward loop. Command model F may include a sensor that detects command signal r and/or the exterior environmental conditions of the aircraft, including weather, wind, or the like. Plant model P may act to generate a "pre-correcting" desired torque of aircraft 100; in other words, P may attempt to generate values of r and y to be as close as possible or equivalently to have plant model prediction generate a minimal degree of error as compared to a desired output. Torque may be measured using any suitable method of measurement. In an embodiment, plant model P may use a machine-learning model, which may be trained using past combinations of operating conditions, generated torque outputs, desired torques, and/or corrections to generated torque outputs as training examples; such training may be performed on aircraft and/or may be performed elsewhere with updates to P transmitted to and instantiated on aircraft. P may use inputs from a mesh network to receive information about current conditions from various nodes of mesh network, and/or may receive such information from one or more sensors of aircraft. Mesh network may include, without limitation, any network described in U.S. Nonprovisional application Ser. No. 17/478,067, filed on Sep. 17, 2021, and entitled "SYSTEM FOR A MESH NETWORK FOR USE IN AIRCRAFTS," the entirety of which is incorporated herein by reference. Mesh network may alternatively or additionally be used to generate training examples, for instance and without limitation in combination with measured torque values of one or more aircraft. Plant model P may continue to learn or be trained by machine learning methods to "pre-correct" the predicted value in the control system; the feedback loops make it faster and easier for plant model to predict information using data from previous loops. Once the first output y is outputted, y and/or a first or higher-order derivative thereof may be provided to control system as feedback, generating one or more error values useable to correct y and/or derivatives; data from feedback correction may be used in training examples to train P further as well. In this disclosure, torque may be measured using back EMF. Where P successfully predicts actual torque value, or in other words, if r* equals the value of y, and derivatives of r* equal those of y, then there may be no difference between the desired and actual outcome and no modification utilizing the feedback loops may be necessary. Moreover, information from inner loop and outer loop controllers $C_a$ and $C_w$ may be compared to actual rate of change u which is put into P; that outputs actual rate of change of torque $\dot{y}$ which then produces actual output $\dot{y}$ using integrator 1/s. If desired and actual values of torque do not match, then feedback loops explained below are needed. Feedback loops may allow inner and outer loop controllers to send modified signals that reduce difference between predicted and actual outputs.

Still referring to FIG. 3, as a function of the feedback loop, y is subtracted from filtered command r* resulting in an error, which is then sent to outer loop controller $C_a$; outer loop controller outputs feedback contribution $\dot{y}_{fb}$. Outer loop controller $C_a$ may include one or more computing devices consistent with this disclosure and/or one or more components and/or modules thereof. Outer loop controller $C_a$ may be implemented using a microcontroller, a hardware circuit such as an FPGA, system on a chip, and/or application specific integrated circuit (ASIC). Outer loop controller $C_a$ may be implemented using one or more analog elements such as operational amplifier circuits, including operational amplifier integrators and/or differentiators. Outer loop controller $C_a$ may be implemented using any combination of the herein described elements or any other combination of elements suitable, therefore. Outer loop controller $C_a$ may be configured to input one or more parameters, such as r. Outer loop controller $C_a$ may periodically detect one or more errors between aircraft angles and commanded angles in any one of pitch, roll, yaw, or a combination thereof. For example, and without limitation, outer loop controller $C_a$ may detect the error between the commanded and detected aircraft torque and command one or more propulsors and or flight components consistent with the entirety of this disclosure to reduce said error in one or more iterations. Outer loop controller $C_a$ may be closed by a PI controller with integral anti-windup via back-calculation. Additional logic may be present to prevent integral windup while grounded on a not perfectly level surface. Gains may be reduced at large amplitude in order to reduce overshoot on large inputs. Outer loop controller $C_a$ biases the comparison between the filtered command $\dot{r}^*$ and the actual rate of change of torque $\dot{y}$, generating a second error function which may then be fed to inner loop controller $C_w$ to calculate feedback rate of change of the command. Feedback contribution $\dot{y}_{fb}$ is the inner loop command that tells the system how to modify rate of change $\dot{y}$. $\dot{y}_{fb}$ is the feedback rate of change of the command determined by the outer loop controller which is then compared to the rate of change of the command as output from the plant.

Still referring to FIG. 3, as a function of a feedback loop, feedback contribution $\overline{y}_{fb}$ and an error generated by subtracting $\dot{y}$ from $\dot{r}^*$ the error from outer loop controller is received by inner loop controller $C_w$ which outputs feedback contribution $u_{fb}$. Inner loop controller $C_w$ may be implemented in any manner suitable for implementation of outer loop controller. The inner loop of the flight controller may be composed of a lead-lag filter for roll rate, pitch rate, and yaw rate, and an integrator that acts only on yaw rate. Integrators may be avoided on the roll and pitch rate because they introduce additional phase lag that, coupled with the phase lag inherent to slow lift fans or another type of one or more propulsors, limits performance. Outer and inner loop controllers may be any of the controllers described in U.S. Nonprovisional application Ser. No. 17/218,428, filed on Mar. 31, 2021, and entitled "METHODS AND SYSTEMS FOR FLIGHT CONTROL CONFIGURED FOR USE IN AN ELECTRIC AIRCRAFT," the entirety of which is incorporated herein by reference.

Still referring to FIG. 3, control output/command u is then received by plant model P which outputs the time derivative $\dot{y}$. $\dot{y}$ may be then put through integrator 1/s and results in final output torque y which is sent out to adjust the aircraft. Using an integrator to attain the output y makes the system more controllable than just outputting y directly from plant model P. With every loop, plant model P is collecting information in order to predict the torque of the aircraft faster and more efficiently.

Still referring to FIG. 3, to represent and explain a control system, a function may be formed using the diagram given. In this disclosure, the control system shown in FIG. 3 can be exemplified by the following equation:

$$y = \int P[C_w(u_{fb} + u^*) + C_a(\dot{y}_{fb} + \dot{r}^* - \dot{y}) + F(r^* - y)] + C_w[C_a(\dot{y}_{fb} + \dot{r}^* - \dot{y}) + F(r^* - y)] + C_a[F(r^* - y)]$$

Figure 4:
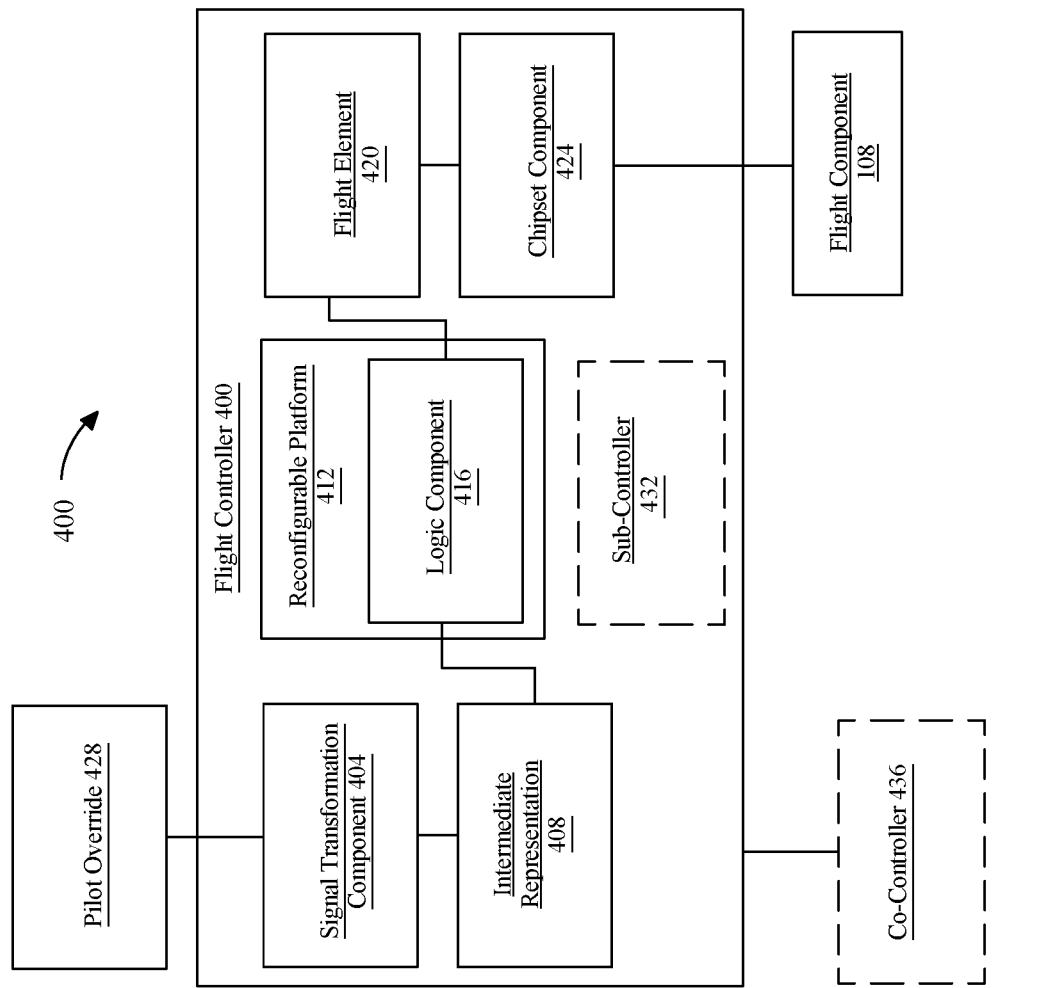
FIG. 4 is a block diagram of an exemplary embodiment of a flight controller.

Now referring to FIG. 4, an exemplary embodiment 400 of a possible controller 240 is illustrated. Thus, a possible controller may be a flight controller, which is illustrated. As used in this disclosure a "flight controller" is a computing device of a plurality of computing devices dedicated to data storage, security, distribution of traffic for load balancing, and flight instruction. Flight controller may include and/or communicate with any computing device as described in this disclosure, including without limitation a microcontroller, microprocessor, digital signal processor (DSP) and/or system on a chip (SoC) as described in this disclosure. Further, flight controller may include a single computing device operating independently, or may include two or more computing device operating in concert, in parallel, sequentially or the like; two or more computing devices may be included together in a single computing device or in two or more computing devices. In embodiments, flight controller may be installed in an aircraft, may control aircraft 100 remotely, and/or may include an element installed in aircraft and a remote element in communication therewith.

In an embodiment, and still referring to FIG. 4, flight controller may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 108. As used in this disclosure a "flight component" is a portion of an aircraft that can be moved or adjusted to affect one or more flight elements. For example, flight component 108 may include a component used to affect the aircrafts' roll and pitch which may include one or more ailerons. As a further example, flight component 108 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller is configured to produce both autonomous and semi-autonomous flight. As used in this disclosure an "autonomous function" is a mode and/or function of flight controller that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller to control and/or maintain a portion of aircraft, a portion of the flight plan, the entire aircraft, and/or the entire flight plan. As a further non-limiting example, pilot signal 436 may include an implicit signal, wherein flight controller detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller and/or a remote device may or may not use in the generation of autonomous function. As used in this disclosure, "remote device" is an external device to flight controller. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller. Remote device and/or FPGA may transmit a signal, bit, datum, or parameter to flight controller that at least relates to autonomous function. Additionally or alternatively, the remote device and/or FPGA may provide an updated machine-learning model. For example, and without limitation, an updated machine-learning model may be included of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller may include, but is not limited to, for example, a cluster of flight controllers in a first location and a second flight controller or cluster of flight controllers in a second location. Flight controller may include one or more flight controllers dedicated to data storage, security, distribution of traffic for load balancing, and the like. Flight controller may be configured to distribute one or more computing tasks as described below across a plurality of flight controllers, which may operate in parallel, in series, redundantly, or in any other manner used for distribution of tasks or memory between computing devices. For example, and without limitation, flight controller may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further includes separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller may also be implemented using a "shared nothing" architecture in which data is cached at the worker, in an embodiment, this may enable scalability of aircraft and/or computing device. Flight controller may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller as components and/or nodes of a distributer flight controller as described above. For example, and without limitation, co-controller 444 may include one or more controllers and/or components that are similar to flight controller. As a further non-limiting example, co-controller 444 may include any controller and/or component that joins flight controller to distributer flight controller. As a further non-limiting example, co-controller 444 may include one or more processors, logic components and/or computing devices capable of receiving, processing, and/or transmitting data to and/or from flight controller to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller may be designed and/or configured to perform any method, method step, or sequence of method steps in any embodiment described in this disclosure, in any order and with any degree of repetition. For instance, flight controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
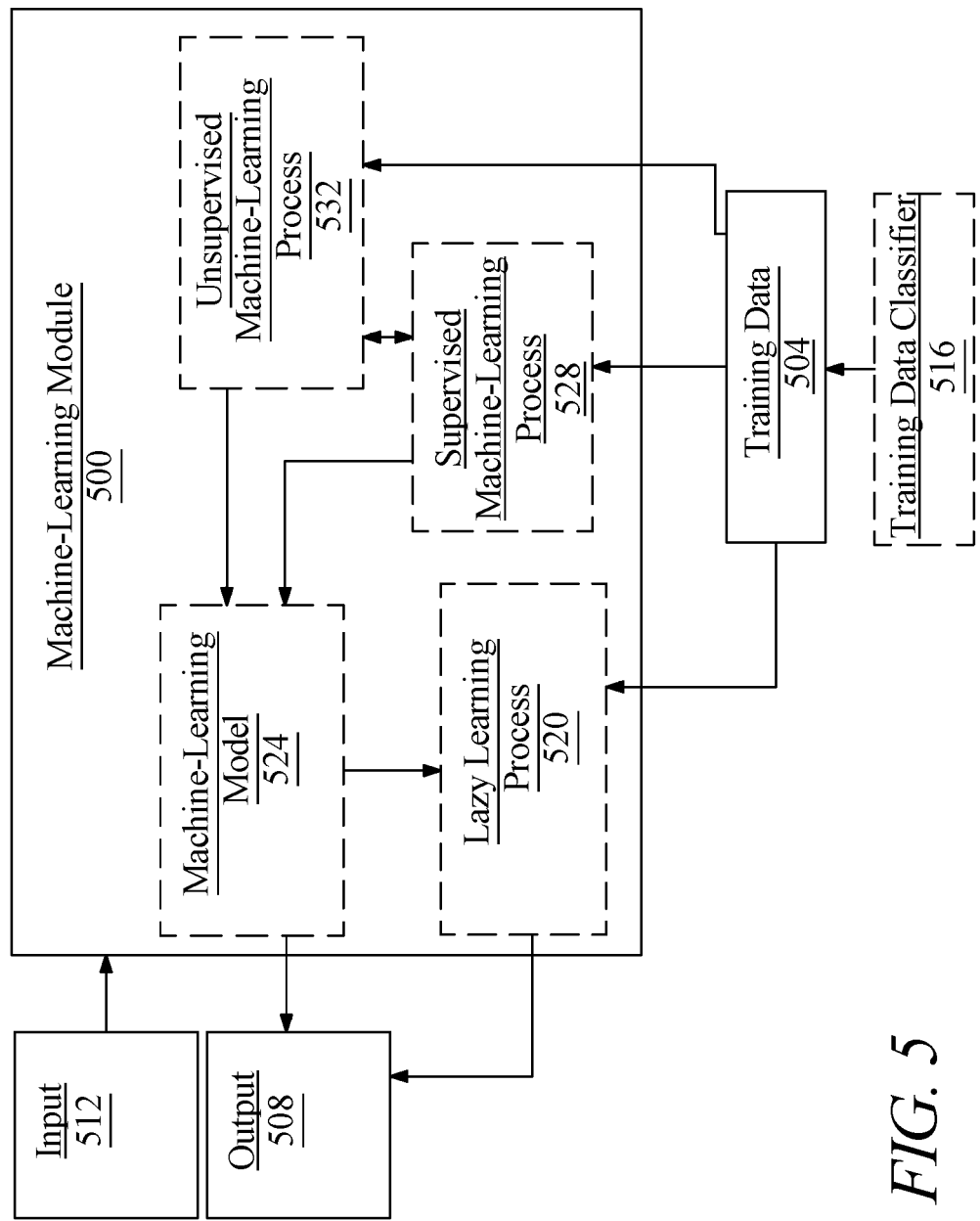
FIG. 5 is a block diagram of an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 542. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
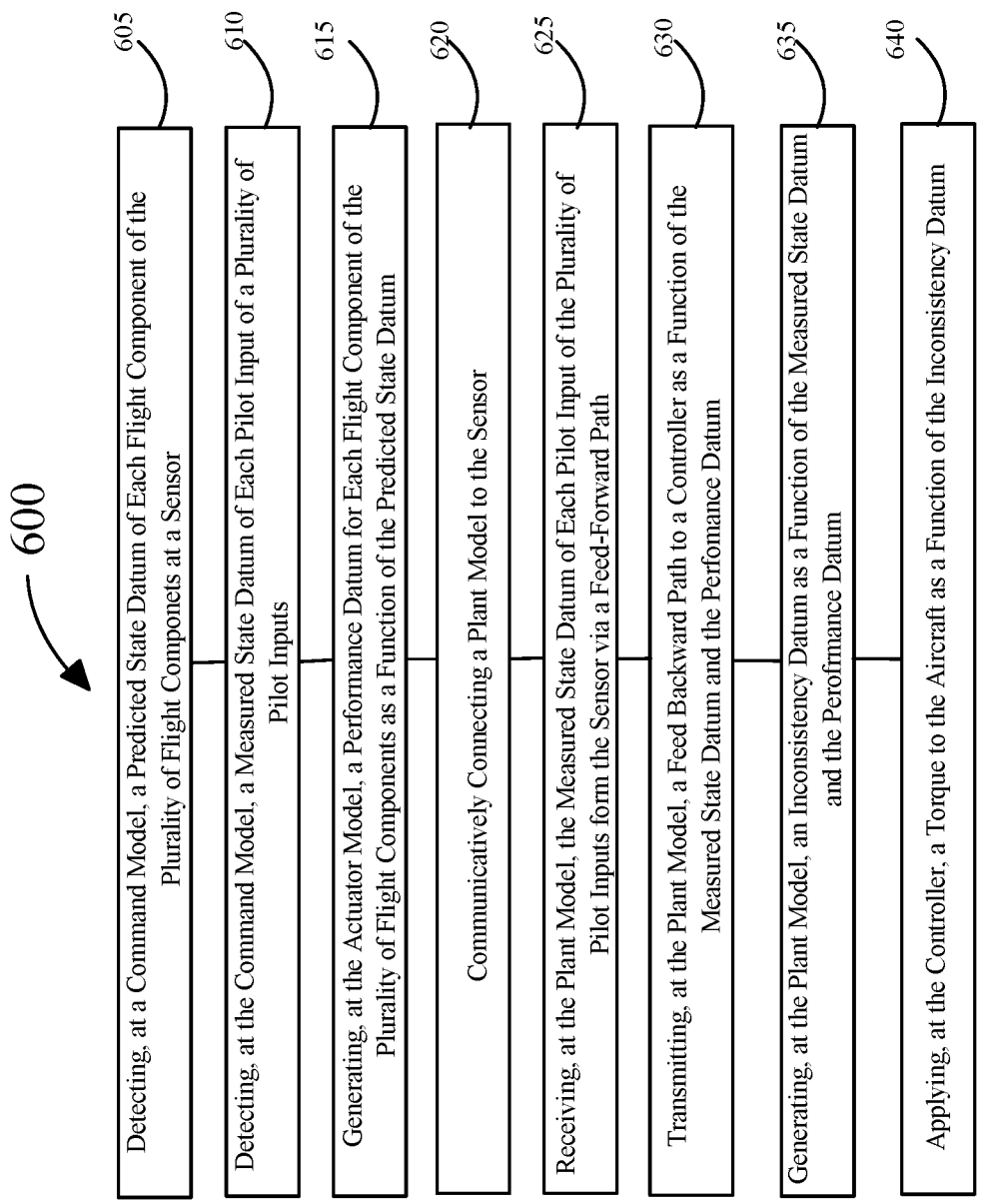
FIG. 6 is a flow diagram of an exemplary embodiment of a method for an aircraft motion observer in an electric aircraft.
Figure 7:
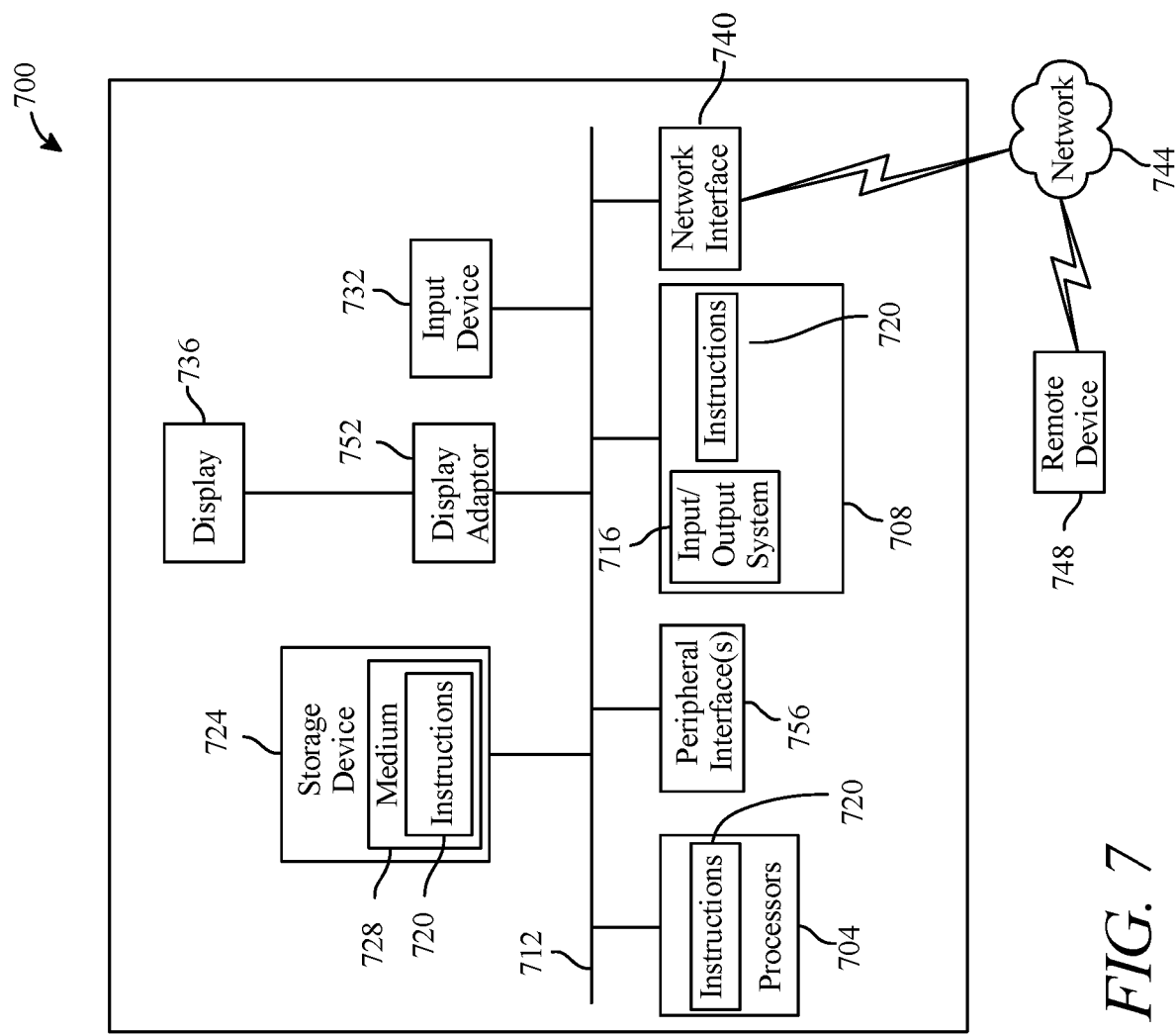
FIG. 7 is a block diagram of a computing system that can be used to implement any one or more of the methodologies disclosed herein and any one or more portions thereof; and The drawings are not necessarily to scale and may be illustrated by phantom lines, diagrammatic representations and fragmentary views. In certain instances, details that are not necessary for an understanding of the embodiments or that render other details difficult to perceive may have been omitted.

Now referring to FIG. 6, an exemplary embodiment of method 600 for an aircraft motion observer in an electric aircraft. The electric aircraft may include, but without limitation, any of the aircraft as disclosed herein and described above with reference to at least FIG. 1.

Still referring to FIG. 6, at step 605, method 600 includes detecting, at command model 208, a predicted state datum 212 of each flight component of plurality of flight components 204. The command model may include, but without limitation, any of the command models as disclosed herein and described above with reference to at least FIG. 2. The predicted state datum may include, but without limitation, any of the predicted state datum as disclosed herein and described above with reference to at least FIG. 2. The plurality of flight components may include, but without limitation, any of the flight components as disclosed herein and described above with reference to at least FIG. 2.

Still referring to FIG. 6, at step 610, method 600 includes detecting, at command model 208, measured state datum 216 of each pilot input of a plurality of pilot inputs. Measured state datum is an element of data describing the torque a pilot desires each flight component of the plurality of flight components to produce. The command model may include, but without limitation, any of the command models as disclosed herein and described above with reference to at least FIG. 2. The measured state datum may include, but without limitation, any of the measured state datum as disclosed herein and described above with reference to at least FIG. 2.

Still referring to FIG. 6, at step 615, method 600 includes generating, at actuator model 220, performance datum 224 for each flight component of plurality of flight components 204 as a function of predicted state datum 212. The actuator model may include, but without limitation, any of the actuator models as disclosed herein and described above with reference to at least FIG. 2. The performance datum may include, but without limitation, any of the performance datums as disclosed herein and described above with reference to at least FIG. 2. The plurality of flight components may include, but without limitation, any of the flight components as disclosed herein and described above with reference to at least FIG. 2. The predicted state datum may include, but without limitation, any of the predicted state datum as disclosed herein and described above with reference to at least FIG. 2.

Still referring to FIG. 6, at step 620, method 600 includes communicatively connecting plant model 228 to the sensor. Plant model may be configured on the controller or a separate controller, as long as it is in communication with the controller of this system. The plant model may include, but without limitation, any of the plant models as disclosed herein and described above with reference to at least FIG. 2.

Still referring to FIG. 6, at step 625, method 600 includes receiving, at plant model 228, measured state datum 216 of each pilot input of the plurality of pilot inputs from the sensor via a feed forward path. The plant model may include, but without limitation, any of the plant models as disclosed herein and described above with reference to at least FIG. 2. The measured state datum may include, but without limitation, any of the measured state datum as disclosed herein and described above with reference to at least FIG. 2.

Still referring to FIG. 6, at step 630, method 600 includes transmitting, at plant model 228, feed backward path 232 to controller 240 as a function of measured state datum 216 and performance datum 224. Transmitting a feed backward path includes comparing the measured state datum value to the performance datum value to see if they match. The plant model may include, but without limitation, any of the plant models as disclosed herein and described above with reference to at least FIG. 2. The feed backward path include, but without limitation, any of the feed backward paths as disclosed herein and described above with reference to at least FIG. 2. The controller may include, but without limitation, any of the controllers as disclosed herein and described above with reference to at least FIG. 2. The measured state datum may include, but without limitation, any of the measured state datum as disclosed herein and described above with reference to at least FIG. 2. The performance datum may include, but without limitation, any of the performance datums as disclosed herein and described above with reference to at least FIG. 2.

Still referring to FIG. 6, at step 635, method 600 includes generate, at plant model 228, inconsistency datum 236 as a function of measured state datum 216 and performance datum 224. The plant model may include, but without limitation, any of the plant models as disclosed herein and described above with reference to at least FIG. 2. The inconsistency datum may include, but without limitation, any of the inconsistency datums as disclosed herein and described above with reference to at least FIG. 2. The measured state datum may include, but without limitation, any of the measured state datum as disclosed herein and described above with reference to at least FIG. 2. The performance datum may include, but without limitation, any of the performance datums as disclosed herein and described above with reference to at least FIG. 2.

Still referring to FIG. 6, at step 640, method 600 includes applying, at controller 240, a torque to aircraft 100 as a function of inconsistency datum 236. Applying the torque to the aircraft is configured to adjust the performance datum, wherein the application of the torque will cause the performance datum and the measured state datum to match. The controller may include, but without limitation, any of the controllers as disclosed herein and described above with reference to at least FIG. 2. The inconsistency datum may include, but without limitation, any of the inconsistency datums as disclosed herein and described above with reference to at least FIG. 2.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for an aircraft motion observer in an electric aircraft, the system comprising:
 a command model communicatively connected to a plurality of flight components of an electric aircraft, wherein the command model comprises a circuitry configured to:
  detect a predicted state datum of each flight component of the plurality of flight components;
  detect a measured state datum of each pilot input of a plurality of pilot inputs;
  transmit the predicted state datum of each flight component of the plurality of flight components to an actuator model;
  transmit the measured state datum of each pilot input of the plurality of pilot inputs to a plant model as a function a feed forward path;
 an actuator model communicatively connected to the sensor, wherein the actuator model comprises circuitry configured to:
  receive the predicted state datum of each flight component of the plurality of flight components from the sensor; and
  generate a performance datum for each flight component of the plurality of flight components as a function of the predicted state datum;
 a plant model communicatively connected to the sensor, wherein the plant model comprises circuitry configured to:
  receive the measured state datum of each pilot input of the plurality of pilot inputs from the sensor;
  receive the performance datum from the actuator model;
  transmit a feedback path to a controller as a function of the measured state datum and the performance datum; and
  generate an inconsistency datum as a function of the measured state datum and the performance datum; and
 a controller communicatively connected to the sensor, wherein the controller comprises circuitry configured to:
  receive the inconsistency datum from the plant model; and
  apply a torque to the aircraft as a function of the inconsistency datum.

2. The system of claim 1, wherein each flight component of the plurality of flight components includes a propulsor.

3. The system of claim 1, wherein each flight component of the plurality of flight components is configured to produce torque.

4. The system of claim 1, wherein the sensor includes a predictive sensor.

5. The system of claim 1, wherein the feed forward path is configured to control the actuator model.

6. The system of claim 1, wherein the actuator model is configured to implement a mathematical model of the dynamics of the plurality of flight components.

7. The system of claim 1, wherein the actuator model is configured on the controller.

8. The system of claim 1, wherein the plant model includes a computing device.

9. The system of claim 1, wherein transmitting a feed backward path includes comparing the measured state datum value to the performance datum value.

10. The system of claim 1, wherein applying the torque to the aircraft is configured to adjust the performance datum, wherein the application of the torque will cause the performance datum and the measured state datum to match.

11. A method for an aircraft motion observer in an electric aircraft, the method comprising:
- detecting, at a command model communicatively connected to a plurality of flight components:
  - a predicted state datum of each flight component of the plurality of flight components; and
  - a measured state datum of each pilot input of a plurality of pilot inputs;
- generating, at an actuator model, a performance datum for each flight component of the plurality of flight components as a function of the predicted state datum;
- communicatively connecting a plant model to the sensor;
- receiving, at the plant model, the measured state datum of each pilot input of the plurality of pilot inputs via a feed-forward path;
- transmitting, at the plant model, a feedback path to a controller as a function of the measured state datum and the performance datum; and
- generating, at the plant model, an inconsistency datum as a function of the measured state datum and the performance datum and
- applying, at a controller, a torque to the aircraft as a function of the inconsistency datum.

12. The method of claim 11, wherein each flight component of the plurality of flight components includes a propulsor.

13. The method of claim 11, wherein each flight component of the plurality of flight components is configured to produce torque.

14. The method of claim 11, wherein the sensor includes a predictive sensor.

15. The method of claim 11, wherein the feed forward path is configured to control the actuator model.

16. The method of claim 11, wherein the actuator model is configured to implement a mathematical model of the dynamics of the plurality of flight components.

17. The method of claim 11, wherein the actuator model is configured on the controller.

18. The method of claim 11, wherein the plant model includes a computing device.

19. The method of claim 11, wherein transmitting a feed backward path includes comparing the measured state datum value to the performance datum value.

20. The method of claim 11, wherein applying the torque to the aircraft is configured to adjust the performance datum, wherein the application of the torque will cause the performance datum and the measured state datum to match.

* * * * *